United States Patent [19]

Steliga

[11] Patent Number: 5,361,164
[45] Date of Patent: Nov. 1, 1994

[54] PROJECTION MARKERBOARD

[75] Inventor: Gregg A. Steliga, Barrington, Ill.

[73] Assignee: Walltalkers, Barrington, Ill.

[21] Appl. No.: 900,942

[22] Filed: Jun. 17, 1992

[51] Int. Cl.⁵ ............................................. G03B 21/56
[52] U.S. Cl. ................................................. 359/455
[58] Field of Search .................... 355/45, 44; 359/443, 359/447, 455; 428/163

[56] References Cited

U.S. PATENT DOCUMENTS 3,549,463 12/1970 Frech ........................................ 161/2
5,200,853 4/1993 Berkman ............................. 359/443

Primary Examiner—Richard A. Wintercorn
Attorney, Agent, or Firm—Roper & Quigg

[57] ABSTRACT

A high quality projection screen which also is a dry erasable markerboard is disclosed, together with a method for making such a combination projection screen and dry erasable markerboard. The light reflecting writing surface of the combination projection screen and dry erasable markerboard preferably is white, off-white or light in color, and has a bi-directional lenticular embossed surface for increased and more accurate reflection of projected light, and a wider angle effective viewing area. The light reflecting writing surface preferably is made of a thin film of fluoropolymer, such as a modified copolymer of ethylene and tetrafluoroethylene.

17 Claims, 2 Drawing Sheets

PROJECTION MARKERBOARD

TECHNICAL FIELD

The present invention relates to a high quality projection screen which is also a dry erasable markerboard surface, and to a method of manufacturing such a projection markerboard.

BACKGROUND ART

It is commonly known in the art that surfaces are available that may be marked on with dry wipe markers, also known as dry erase markers or dry erasable markers. These markers use solvent based ink which dries to a powder after it has been applied to a surface, commonly a smooth, glossy, plastic surface. These markers commonly come in different colors.

When a user writes on a dry erasable writing surface using conventional dry erasable markers, the ink readily adheres to the surface and may be applied in thick or thin strokes. The ink, after it dries, will adhere to the dry erasable writing surface for a long period of time, e.g., at least several months, without significantly flaking or otherwise peeling away from the dry erasable writing surface.

The dry erasable marker ink, when applied, dries to a powder and may be readily wiped off from the dry erasable writing surface with a dry cloth or dry eraser. No solvent of any kind is needed in the erasing, hence these markers are known as "dry wipe," "dry erase," or "dry erasable." These terms are used interchangeably in the specification and claims.

One common dry erase marker is sold by the Sanford Corp., Bellwood, Ill. under the registered trademark, EXPO. The writing surfaces, commonly white in appearance, adapted for use with such markers are commonly known as dry erase boards, dry erasable boards, write boards or white boards. These terms also are used interchangeably in the specification and claims.

This method of erasable writing is to be contrasted with the earlier-known use of chalk on slate or other surfaces which were used as chalkboards. This is also to be contrasted with those surfaces where markers were used and the markings could only be removed by application of solvents such as water, or an organic solvent such as mineral spirits.

It also is commonly known to use various materials as projection screens for reflecting the projected light of movies, slides, or overhead projections so that the associated audience is able to perceive the projected light. Such materials are normally white, off-white or a light-color so as to best allow perception of the projected light and to allow such light to be perceived in the color range intended.

Prior to the present invention, dry erasable markerboards, while generally being white, have not served adequately as projection surfaces. This failure on the part of the prior art is due primarily to the high gloss surface of the dry erasable markerboards. Further, prior high quality projection surfaces were known, but, these projection surfaces were not able to be marked upon with dry erase markers and the markings then dry erased.

DISCLOSURE OF INVENTION

The present invention provides a substantially opaque, dry erasable, bi-directional lenticular surface that can be used as a high quality projection screen allowing quality viewing from more severe angles than those of projecting screens commonly known in the art. Further, the material of the present invention can accept markings by dry erasable markers with such markers functioning as is normally expected, that is, when dried, the markings are able to be removed by simple mechanical application of a dry cloth, dry felt eraser, dry fiberglass eraser, or other dry-type eraser. The invention optionally includes means whereby the material can be affixed to various surfaces such as walls, steel boards, or other flat surfaces.

In one embodiment, the dry erasable, bi-directional lenticular surface of the present invention can be formed of a single material which is both a substantially opaque light reflecting surface and a dry erasable marker contacting surface. However, in the preferred embodiment, the surface is one surface of a layered material composed of (1) a substantially transparent or translucent dry erase marker contacting layer, (2) a white, off-white, or light colored substantially opaque projection layer and, optionally, (3) a backing layer to allow the material to be affixed to a wall or other flat surface. Such a layered material can be created in large sheets. Two common backing layers are an adhesive backing for application to steel or other flat surfaces and a paper backing so that the material can be affixed to the walls using conventional wallpapering techniques and adhesives.

The present invention also provides a method for manufacturing such a layered material. The substantially transparent or translucent dry erase marker contacting layer is coated with an adhesive such as a substantially transparent, translucent or white adhesive, and laminated to the substantially white opaque projection layer. The laminate is then heat embossed on the dry erase marker contacting surface using a bi-directional lenticular roller, preferably having approximately 90–100 lines per inch. Where it is desired to add the optional backing layer, an adhesive such as a pressure sensitive adhesive is laminated to the embossed laminate, or a non-woven backing may be applied to the laminate before embossing to create a wallpaper-type material. The material then may be attached to any flat surface such as entire walls, over old chalkboards, or may be attached to metal (preferably steel or other magnetic surfaces) panels to create free-standing or hangable projection markerboards which, because of the steel or magnetic backing, also allow magnets to be removably affixed to the board.

MODES FOR CARRYING OUT THE INVENTION

Figure 1:
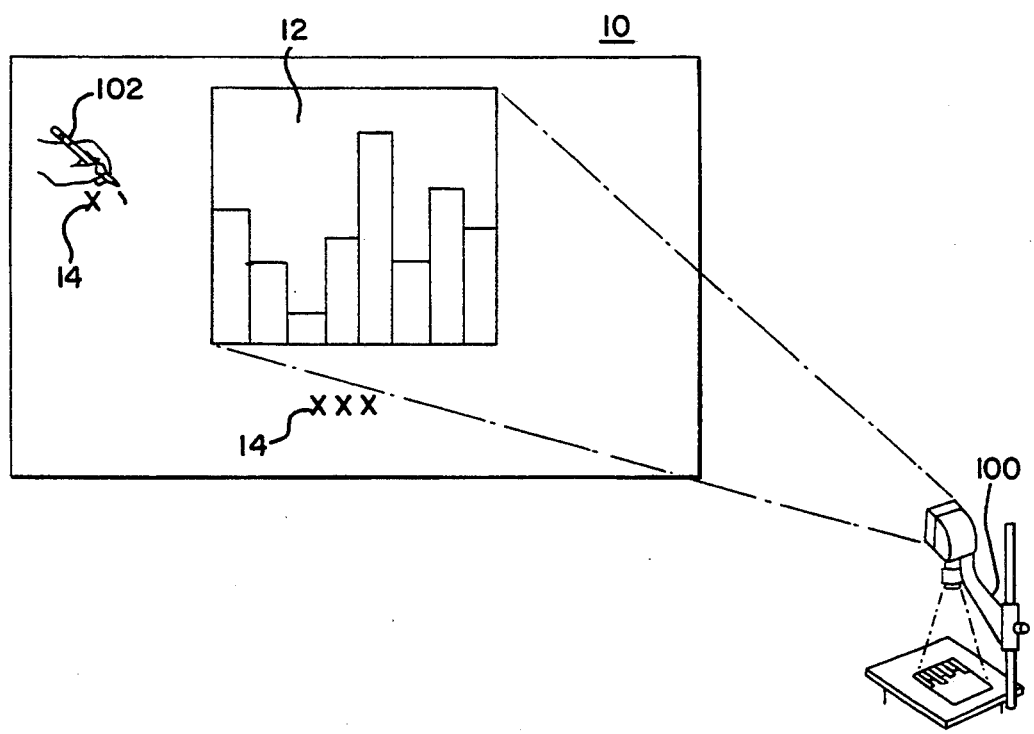
FIG. 1 is a schematic perspective view of the projection markerboard of the present invention along with a typical prior art projector showing both a projected image and dry erasable markings on the screen.

The present invention is a substantially opaque, dry erasable, bi-directional lenticular surface. As seen in FIG. 1, this surface 10 is able to act as a combination projection screen and markerboard. The surface 10 has a projected image area 12 which is the area reflecting the projected light from projector 100. Along with projected image 12, the surface 10 contains handwritten markings 14 which have been applied by hand with dry erasable marker 102. The surface 10 functions as a dry erasable surface for the markings 14.

Figure 2:
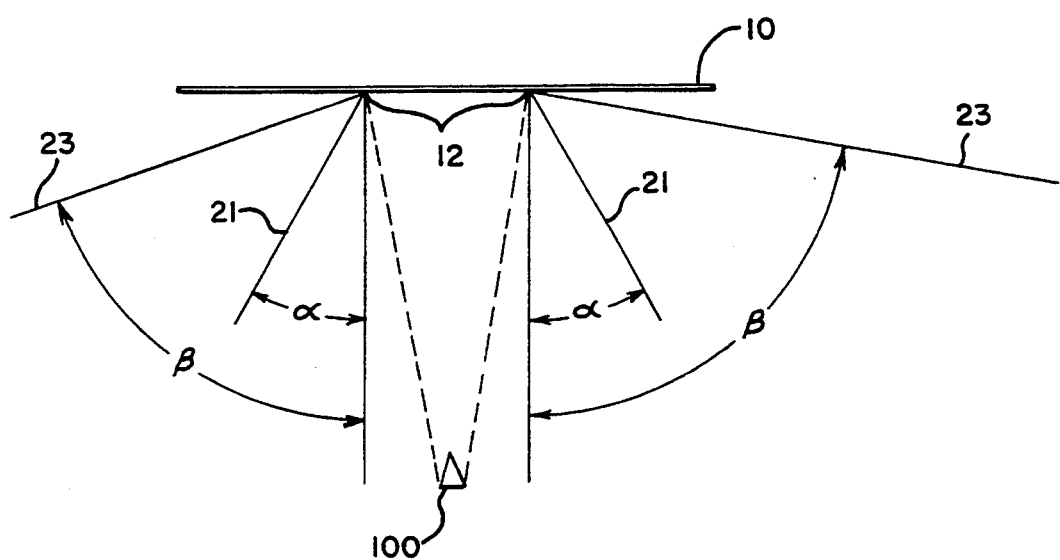
FIG. 2 is a top view of FIG. 1, showing the available lines of sight and viewing angles.

With respect to the projection screen attributes of screen 10, they are superior to screens commonly known in the art. Referring to FIG. 2, a top view is seen of the screen of FIG. 1 with light source, or projector 100 and the projected image area 12. In conventional screens, the effective viewing area is that area between lines of sight 21, where the viewer is looking directly perpendicularly at the screen in the projected image area 12 or within α degrees from a perpendicular to the screen at the edge of projected image area 12 as seen in FIG. 2. With the present invention, the effective viewing area is the area between lines of sight 23, which as shown in FIG. 2 is the area where a viewer is looking directly perpendicularly at the screen in projected image area 12 or within β degrees from a perpendicular to the edge of projected image area 12. Because of the bi-directional lenticular surface of screen 10, the viewing angles β have been found to be in excess of the typical viewing angles α for projection screens commonly known in the art.

In one embodiment, surface 10 is provided by a material which is made of essentially two layers which function respectively as the dry erasable marker contacting surface layer (i.e., the writing surface), and a light reflecting projection layer. Optionally, a backing layer also is provided. Additional layers may be added, or a single layer may be substituted for multiple layers so long as that layer performs the functions of the multiple layers without departing from the spirit of the invention.

Figure 3:
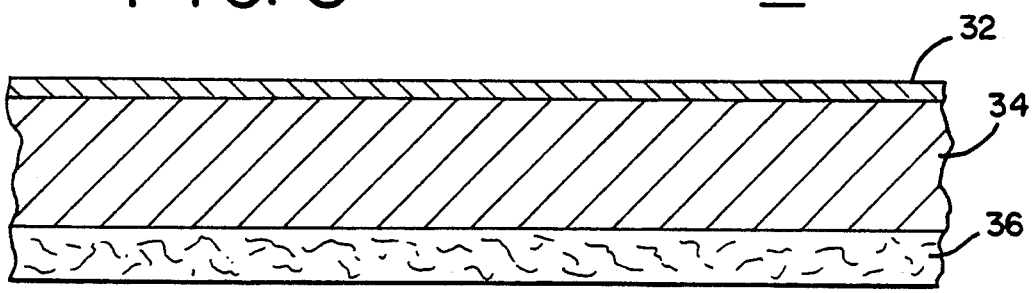
FIG. 3 is a schematic sectional view of a material of the present invention with wallpaper-type backing.

The preferred embodiment known to the inventor will now be described in detail by reference both to the materials involved and by reference to the process of manufacture. Referring to FIG. 3, the preferred embodiment is a material 30 which comprises three layers. The first layer 32, the writing surface layer, is the dry erase marker contacting surface. Thus, an essential feature of this first layer is that it have properties which allow the release of the markings made by dry erase markers. This release is accomplished by application of a felt or other dry erase marker eraser. Preferably, this first layer 32 is a thin film made of a fluoropolymer. More preferably, the first layer 32 is a thin film made of a copolymer of ethylene and tetrafluoroethylene. The most preferable film for this first layer 32 known to the inventor is a one mil thick film made from a modified copolymer of ethylene and tetrafluoroethylene with the structure:

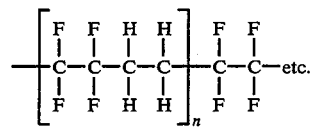

Such a copolymer is sold by the Specialty Polymers Division of E. I. du Pont de Nemours & Co. under the tradename TEFZEL 100CLZ NG. The film must be manufactured in such a manner so that the glossiness of the film is minimized. This is accomplished by adding a fluoropolymer non-glare additive to the fluoropolymer. In the preferred embodiment, a non-glare additive such as that sold by Chromatics, Inc. as 27029-05-6XV fluoropolymer non-glare additive is added to the polymer during extrusion at 10±5% by weight.

Where the first layer 32 is manufactured as noted above, the first layer 32 is translucent. Thus, a substantially opaque second layer 34, the light reflecting layer, is necessary to provide opacity so that the surface underlying the material of the invention does not show through. As such, this second layer acts essentially as the light reflecting surface which makes the projected light visually perceptible. Various substantially opaque materials such as films of vinyl, polyester, polypropylene or the like which can provide the necessary projection capabilities as well as the flexibility needed for applying the material to a surface can be used as second layer 34. A non-flexible material can be used as second layer 34; however, in such cases, the resulting material 30 is limited in its applications. In the preferred embodiment, a 6 mil thick, non-migratory, semi-rigid type, off-white matte finish vinyl is used as the second layer 34.

The third layer 36 is a backing material which allows the material to be affixed to various surfaces. One common type of backing material 36 shown in FIG. 3 is a non-woven polyester backing. When material 30 is prepared with such a non-woven polyester backing it is similar to wallpaper and can be affixed to walls using ordinary wallpapering methods and adhesive.

Figure 4:
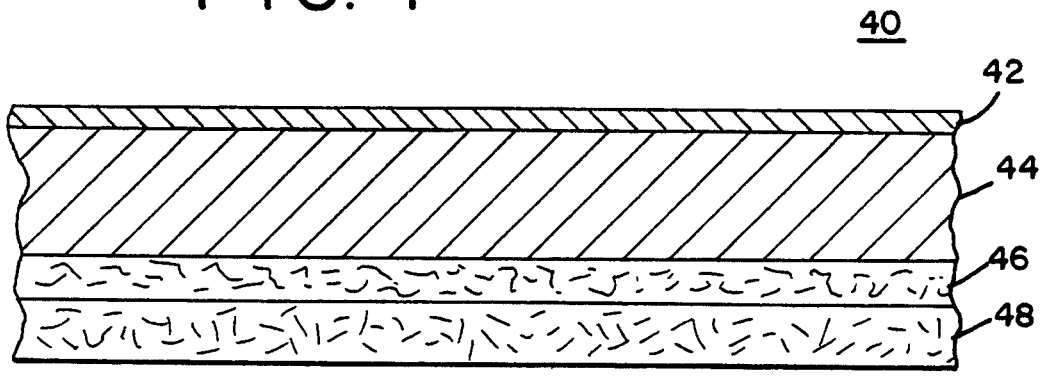
FIG. 4 is a schematic sectional view of with a material of the present invention with pressure-sensitive adhesive showing adhesion to a steel board.

FIG. 4 shows an alternate embodiment of the material 40 of the invention. First layer 42 and second layer 44 are as described above. However, in the embodiment of FIG. 4, backing 46 is a pressure sensitive adhesive. FIG. 4 further shows a steel layer 48 to which the material is adhered. In this embodiment the combination projection screen and markerboard can be freestanding or framed or unframed in a hangable version and also allows releasable magnetic attachments to be releasably attached to the markerboard to aid in presentations and use.

The material is manufactured in a multi-stage process. Initially, the fluoropolymer film, with non-glare additives, is prepared as the first layer. The film is formed by polymerizing the monomers to form the fluoropolymer. Next, non-glare fluoropolymer additive is added to the polymer. The compounded polymer is then extruded into film.

Because fluoropolymer film is essentially resistant to chemical attack, a property of the film which allows it to release the dry erasable markers, the film must be treated to allow adhesive bonding to the second layer. The fluoropolymer film is corona treated on one side in an acetone atmosphere in a manner such as that taught in U.S. Pat. No. 3,676,181. After corona treatment, the polymer will accept adhesive for bonding.

The side of the film which has been corona treated as noted above is coated with a thermoset polyester based adhesive. The coated film is then passed through an oven to drive off the solvent from the adhesives. The film with the dried adhesive is then passed through a laminating machine heated to approximately 135°-150° C. as it passes through the laminating rollers. Preferably, this lamination is accomplished on a web or roll-to-roll lamination machine with the rollers set at 135°-150° C. mixing heat and pressure. The heat treatment activates the adhesive and using heat and pressure the first layer is then bonded to the second layer forming a permanently bonded two-layer laminate. This laminate is allowed to cure for about two days. At this point, if it is desired to make the material in the form shown in FIG. 3, that is, a wallpaper, then a backing such as a non-woven polyester backing is laminated onto the second layer by applying polyester based adhesive on the vinyl and bonding by using approximately 135° C. and pressure to bond the non-woven backing and vinyl.

The laminate, with or without backing, is then subjected to heat embossing using a roller with a bi-directional lenticular roller. In the preferred embodiment, this roller has approximately 90-100 lines criss-crossing per inch with a 3 mil depth of pattern. The pattern used is sometimes referred to as a Teffetta embossing pattern. The embossing is preferably accomplished by using a roll to roll embossing machine with a preheated web. The fluoropolymer/vinyl film laminate or the fluoropolymer film/vinyl/non-woven backing laminate is heated by passing the same through two hot metal rollers (approximately 65°-80° C.). The laminate then passes through two chilled rollers (approximately −10° C.) one roller being the metal embossing roller and the other being a hard rubber roller. The laminate passes over an additional chilled roller before being rewound onto a master roll.

Figure 5:
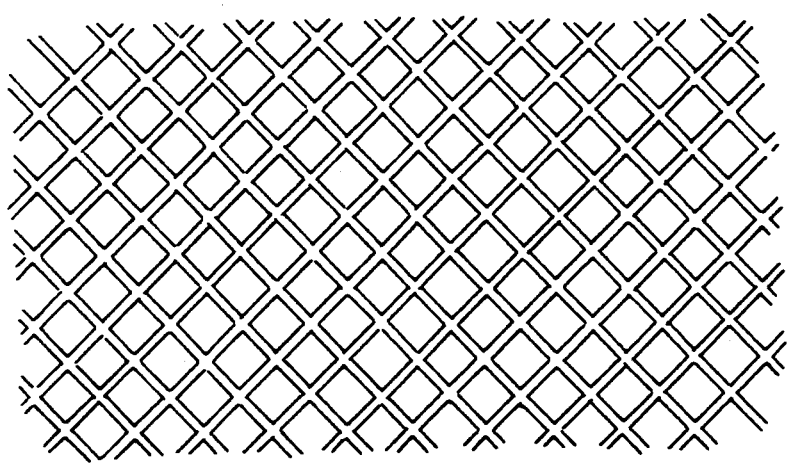
FIG. 5 is a close-up schematic view of the bi-directional lenticular surface of the present invention.

By this embossing process, a surface as shown in FIG. 5 is obtained. This step is critical in that it is the embossing which yields, in this embodiment, a bi-directional lenticular surface. This bi-directional lenticular surface has thousands of reflective surfaces per square inch. This surface diffuses ambient light evenly with virtual elimination of hot spots or glare when light is projected on the surface. Thus, a high quality screen is created which brings out distinct high-intensity colors and sharp definition. Moreover, the low glare in part makes the wider viewing angle β depicted in FIG. 2 possible. In the preferred embodiment, the final surface is a bi-directional lenticular pattern with approximately 40,000 reflective surfaces per square inch.

If a wallpaper-type backing has not been laminated to the material, other backings or other means of affixing the material to a surface may be used. In one such embodiment, as seen in FIG. 4, a layer of pressure sensitive adhesive is the laminate. This is done by laminating an adhesive covered by a silicone release liner to the vinyl film layer of the embossed laminate. The pressure sensitive adhesive is applied after embossing, unlike the non-woven polyester backing embodiment which may be applied before embossing, because, in general, the pressure-sensitive adhesive layer is too thick to be applied before the embossing step and have the embossing step be efficient and effective. The resulting product is then applied to surfaces such as the steel layer of FIG. 4 by taking off the release liner. The material is then adhered to the steel preferably by applying the laminate to the steel with a pinch roller so that the adhesive bond is strong.

Alternately, the material backed in either manner may be used to cover entire walls, may be used to cover old chalkboards, may be made as architectural panels or in wall mount framed or unframed panels.

In some embodiments, the substantially opaque second layer is marked with a faint grid or other patterns (e.g. rulers, maps etc.) to further facilitate projection and marking capabilities.

From the above description it is apparent that the objects of the present invention have been achieved. While only certain embodiments have been set forth, attentive embodiments and various modifications will be apparent from the above description to those skilled in the art. For example, while the preferred embodiment is a multi-layer structure, normally three layers, more or less layers may be used if the objects of the invention are achieved. These and other alternatives are considered equivalents and within the spirit of the present invention.

Having described the invention, what is claimed is:

1. A combination projection screen and dry erasable markerboard comprising a substantially opaque, dry erasable, reflective, bi-directional lenticular surface.

2. The combination projection screen and dry erasable markerboard of claim 1 wherein the substantially opaque, dry erasable, bi-directional lenticular surface comprises a dry erasable marker contacting layer and a light reflecting projection layer.

3. A combination projection screen dry erasable markerboard comprising a substantially opaque, dry erasable, reflective, hi-directional lenticular surface wherein the substantially opaque, dry erasable, bi-direction lenticular surface comprises a dry erasable marker contacting layer and a light reflecting projection layer wherein the dry erasable marker contacting surface is a thin film of a fluoropolymer.

4. The combination projection screen and dry erasable markerboard of claim 3 further comprising a backing layer.

5. The combination projection screen and markerboard of claim 3 wherein the fluoropolymer is a copolymer of ethylene and tetrafluoroethylene.

6. The combination projection screen and markerboard of claim 5 wherein the copolymer has the structure:

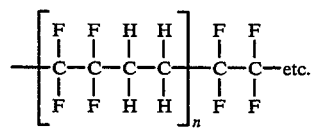

7. The combination projection screen and markerboard of claim 3 wherein said fluoropolymer contains a fluoropolymer non-glare additive.

8. The combination projection screen and markerboard of claims 3, 5, 6, or 7 wherein the light reflecting layer is a film chosen from the group consisting of polyester, polypropylene and polyvinyl chloride.

9. The combination projection screen and markerboard of claim 8 wherein the light reflecting layer is polyvinyl chloride which is non-migratory, semi-rigid type off-white matte finish vinyl.

10. The combination projection screen and markerboard of claim 4 wherein the backing layer is non-woven polyester.

11. The combination projection screen and markerboard of claim 4 wherein the backing layer is pressure sensitive adhesive.

12. The combination projection screen and markerboard of claim 4 further comprising a metallic layer adhered to said backing layer.

13. A method of making a combination projection screen and markerboard comprising the steps of laminating together a first layer which is a thin film of a fluoropolymer and a second layer formed from a film made from the group consisting of polypropylene, polyester, and polyvinyl chloride, and embossing the resulting laminate to provide a substantially opaque, dry erasable, bi-directional lenticular surface.

14. The method of making a combination projection screen and markerboard of claim 13 wherein the fluoropolymer is a copolymer of ethylene and tetrafluoroethylene.

15. The method of making a combination projection screen and markerboard of claim 14 wherein the copolymer has the structure:

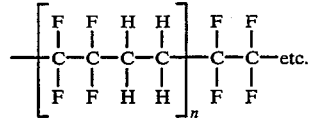

16. The method of making a combination projection screen and markerboard of claim 13 further comprising the step of a adding a fluoropolymer non-glare additive to said fluoropolymer before said laminating step.

17. The method of making a combination projection screen and markerboard of claims 13, 14, 15, or 16 further comprising the step of corona treating at least one side of said fluoropolymer before said laminating step.

* * * * *